(12) United States Patent
Mita et al.

(10) Patent No.: US 6,663,964 B2
(45) Date of Patent: Dec. 16, 2003

(54) HEAT DISSIPATING STRUCTURE

(75) Inventors: Kunihiko Mita, Annaka (JP); Akio Suzuki, Yoshii-machi (JP); Tsutomu Yoneyama, Annaka (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 0 days.

(21) Appl. No.: 10/294,722

(22) Filed: Nov. 15, 2002

(65) Prior Publication Data

US 2003/0096116 A1 May 22, 2003

(30) Foreign Application Priority Data

Nov. 21, 2001 (JP) .......................................... 2001-355872

(51) Int. Cl.$^7$ ................................................. B32B 9/00
(52) U.S. Cl. ...................... 428/408; 428/209; 428/402; 428/403; 428/407; 428/446; 428/447; 361/709; 423/448
(58) Field of Search ................................ 428/408, 209, 428/402, 403, 407, 531, 626, 446, 447; 361/708, 709; 423/448; 156/324, 583.1

(56) References Cited

U.S. PATENT DOCUMENTS 6,391,442 B1 * 5/2002 Duvall et al. ................ 428/348
6,482,520 B1 * 11/2002 Tzeng ......................... 428/408
6,483,707 B1 * 11/2002 Freuler et al. ............... 361/713

* cited by examiner

*Primary Examiner*—Deborah Jones
*Assistant Examiner*—Abraham Bahta
(74) *Attorney, Agent, or Firm*—Oblon, Spivak, McClelland, Maier & Neustadt, P.C.

(57) ABSTRACT

A heat dissipating structure is provided which lowers the thermal contact resistance between a heat generating electronic component and a heat dissipating component, and markedly improves the heat radiation. The heat dissipating structure comprises a graphite sheet and a heat conducting material layer provided on at least one surface of the graphite sheet, and is positioned between the electronic component and the heat dissipating component. The heat conducting material has no fluidity at room temperature when the electronic component is not operating, but undergoes a reduction in viscosity, softens or melts, under the influence of heat generated during operation of the electronic component.

15 Claims, No Drawings

HEAT DISSIPATING STRUCTURE

BACKGROUND OF THE INVENTION

1. Field of the Invention

The present invention relates to a heat dissipating structure, and in particular to a heat dissipating structure used as a thermal interface provided between a heat generating electronic component and a heat dissipating component such as a heat sink or a circuit board for the purposes of cooling the heat generating electronic component.

2. Description of the Prior Art

In the circuit design of recent electronic equipment such as televisions, radios, computers, medical instruments, office equipment and communication devices, advances in miniaturization of these devices has led to great increases in complexity in the circuit design. For example, electronic equipment incorporating hundreds of thousands of transistors, and integrated circuits for other electronic equipment are now being produced. The complexity of the circuit designs continues to increase, and the demands continue for incorporating even smaller electronic components into even smaller areas, and increasing the numbers of electronic components even further.

As a result, a more effective method of diffusing the heat generated by these electronic components, which is a common cause of malfunction or failure of such components, is now required. In other words, as the degree of integration of LSI devices such as CPUs, driver ICs and memory used in electronic equipment such as personal computers, digital video disc players and mobile telephones has increased, large numbers of heat diffusion methods, as well as heat diffusion members and materials used in such methods, have been proposed.

In conventional electronic equipment and the like, a heat sink utilizing a metal sheet with a high thermal conductivity such as brass is used to suppress increases in the temperature of any particular electronic component during use of the equipment. This heat sink conducts the heat generated by the electronic component, and uses the temperature difference with the outside air to radiate the heat away from the component surface.

In order to ensure that heat generated from the electronic component is conducted efficiently into the heat sink, the heat sink must be in close contact with the electronic component. However, due to differences in the height between individual electronic components, and the tolerances allowed during the assembly process, a variety of methods are used to improve the thermal conductivity from the electronic component to the heat sink, including using heat conducting sheets with good flexibility, and inserting heat conducting grease between the electronic component and the heat sink in order to lower the thermal contact resistance therebetween.

Examples of the above type of heat conducting sheet include a graphite sheet with a heat conducting silicone rubber coating provided on either one surface or both surfaces thereof, as disclosed in Japanese Post-examination Patent Publication (kokoku) No. 3-51302 (JP3-51302B), and a heat dissipating structure comprising a silicone rubber layer filled with an electromagnetic wave shielding material laminated onto a graphite film, as disclosed in Japanese Laid-open publication (kokai) No. 11-340673 (JP11-340673A).

However, although the graphite sheet used in the heat dissipating structure disclosed in the aforementioned Japanese Laid-open publication (kokai) No. 3-51302 (JP3-51302A) is an anisotropic high thermal conductivity material with a thermal conductivity of 5 W/m·K in the direction through the lamination, and 500 W/m·K in directions along the material surface, the sheet itself displays considerable hardness, and when covered with a heat conducting silicone rubber, the observed reduction in thermal contact resistance is not always entirely satisfactory. Consequently, a heat dissipating structure capable of further reducing the thermal contact resistance has been keenly sought.

SUMMARY OF THE INVENTION

An object of the present invention is to provide a heat dissipating structure capable of reducing the thermal contact resistance between a heat generating electronic component and a heat dissipating component, and markedly improving the heat radiation.

As a result of intensive investigations aimed at resolving the above problems, the inventors of the present invention developed a heat dissipating structure comprising an uncured composition which is a solid sheet at room temperature and is capable of conforming to any shape required of the surface layer and contacting the surface with good thermal conductivity, and is consequently easily positioned or removed from between an electronic component and a heat dissipating component such as a heat sink, and yet is capable of offering excellent heat dissipating performance by softening under the influence of heat generated during operation of the electronic component, and markedly reducing the thermal contact resistance.

In other words, as a device for resolving the aforementioned problems, the present invention provides a heat dissipating structure for positioning between an electronic component and a heat dissipating component, comprising a graphite sheet and a heat conducting composition layer provided on at least one surface of the graphite sheet, wherein the heat conducting composition has no fluidity at room temperature when the electronic component is not operating, but undergoes a reduction in viscosity, softens or melts, under the influence of heat generated during operation of the electronic component.

DESCRIPTION OF THE PREFERRED EMBODIMENTS

As follows is a description of specifics of the present invention using a series of embodiments.

Graphite Sheet

Provided a sheet of the present invention is formed from graphite, there are no particular restrictions on the production method or the like. The thickness of the sheet should preferably be from 0.01 to 1.5 mm, and even more preferably from 0.1 to 1.0 mm. If the sheet is too thin, the mechanical strength deteriorates and the sheet becomes brittle, whereas if the sheet is too thick, the flexibility becomes inadequate. This type of graphite sheet can be obtained easily as a commercially available product.

Heat Conducting Material

A heat conducting material used in the present invention has no fluidity at room temperature when the electronic component is not operating, but displays a reduction in viscosity, softens or melts, under the influence of heat generated during operation of the electronic component. Specifically, any materials which undergo a reduction in viscosity, soften or melt within a temperature range from 40 to 100° C. can be used.

Specific examples of suitable heat conducting materials include heat conducting compositions comprising an organic resin which forms a matrix phase, and a heat conducting filler.
[Resin Component]

Organic resins which can be used in such heat conducting compositions must have good heat resistance at the operating temperatures of the electronic component, must display no fluidity at room temperature when the electronic component is not operating, but display softening, a reduction in viscosity, or undergo melting at the operating temperature of the electronic component. Provided the organic resin has these characteristics, then almost any resin can be used without any particular restrictions. Examples of suitable resins include silicone resins, α-olefin based resins, and paraffin based resins, although of these, silicone resins are preferred.

More specific examples of silicone resins ideally suited to the present invention are described below.

Any silicone resin may be used provided the heat conducting composition is essentially solid (non-fluid) at room temperature, but softens, reduces in viscosity or melts, so that at least the surface thereof becomes fluid, at temperatures within a range between 40° C. and the maximum temperature reached due to the heat generated by the heat generating electronic component, namely 40 to 100° C., and preferably 40 to 90° C. This requirement is an important factor in causing softening of the matrix phase.

What is described here as the temperature at which softening, a reduction in viscosity or melting occurs, refers to the temperature for the heat conducting composition, and the silicone resin itself may have a melting point of less than 40° C. (so that the silicone resin itself may be fluid at room temperature).

Any silicone resin which satisfies the above conditions may be used, although examples of resins capable of ensuring non-fluidity at room temperature include polymers incorporating $RSiO_{3/2}$ units (hereafter referred to as T units) and/or $SiO_2$ units (hereafter referred to as Q units), and copolymers of these materials with $R_2SiO$ units (hereafter referred to as D units). Silicone oils or silicone green rubber (i.e., silicone gum) formed of D units may also be added. Of these resins, silicone resins containing T units and D units, and combinations of a silicone resin containing T units, and a silicone oil or a silicone green rubber with a viscosity at 25° C. of at least 100 Pa·s are preferred. The silicone resin may also have the terminals blocked with $R_3SiO_{1/2}$ units (M units).

The aforementioned R group is a substituted or unsubstituted monovalent hydrocarbon group of 1 to 10 carbon atoms, and preferably 1 to 6 carbon atoms. Specific examples include alkyl groups such as methyl groups, ethyl groups, propyl groups, isopropyl groups, butyl groups, isobutyl groups, tert-butyl groups, pentyl groups, neopentyl groups, hexyl groups, cyclohexyl groups, octyl groups, nonyl groups and decyl groups; aryl groups such as phenyl groups, tolyl groups, xylyl groups and naphthyl groups; aralkyl groups such as benzyl groups, phenylethyl groups and phenylpropyl groups; alkenyl groups such as vinyl groups, allyl groups, propenyl groups, isopropenyl groups, butenyl groups, hexenyl groups, cyclohexenyl groups and octenyl groups; and groups in which either a portion of, or all of the hydrogen atoms of the aforementioned groups have been substituted with halogen atoms such as fluorine atoms, bromine atoms or chlorine atoms, or cyano groups, such as chloromethyl groups, chloropropyl groups, bromoethyl groups, trifluoropropyl groups and cyanoethyl groups. Of these, methyl groups, phenyl groups and vinyl groups are particularly preferred.

Describing the silicone resin in further detail, the silicone resin can incorporate T units and/or Q units, and can be designed with M units and T units, or M units and Q units. However, introducing T units is an effective method of ensuring excellent toughness in the solid state (by improving the brittleness and preventing breakage during handling), and the resin should also preferably contain D units. The substituent group (R) of the T units should preferably be methyl groups or phenyl groups, and the substituent groups (R) of the D units should preferably be methyl groups, phenyl groups or vinyl groups. The ratio of T units to D units should be within a range from 10:90 to 90:10, and preferably from 20:80 to 80:20.

Moreover, even for resins synthesized from typically used M units and T units, or M units and Q units, the addition of a high viscosity oil (of at least 100 Pa·s) or a compound in the form of a green rubber containing T units, and formed mainly of D units (and with M units at the terminals) improves the brittleness of the resin, and furthermore also prevents pumping out (the formation of gas bubbles or the bleeding of the base siloxane as a result of separation of the filler and the base siloxane) in the case of a heat shock. Accordingly, in those cases in which a silicone resin containing T units but containing no D units is used, a high viscosity oil or a green rubber compound or the like containing D units as a main constituent should preferably be added to the silicone resin.

Accordingly, in those cases in which a silicone resin with a softening point incorporates T units but incorporates no D units, then provided a high viscosity oil or a green rubber or the like containing D units as a main constituent is added, a material with excellent handling properties can be produced. In such cases, the quantity added of the high viscosity oil or green rubber compound or the like containing D units as a main constituent is typically within a range from 1 to 100 parts by weight, and preferably 2 to 10 parts by weight per 100 parts by weight of a silicone resin with a softening point or a melting point at a temperature above room temperature. If the added quantity is less than 1 part by weight, then the possibility of a pumping out phenomenon occurring increases significantly, whereas if the quantity exceeds 100 parts by weight, then the thermal resistance increases, and there is a danger of a significant reduction in the heat dissipating performance.

In order to achieve the critical viscosity reduction as described above, the silicone resin should preferably have a comparatively low molecular weight. The molecular weight of this type of low melting point silicone resin is typically within a range from 500 to 10,000, and preferably from 1000 to 6000.

Silicone resins which impart both flexibility and tackiness (necessary to ensure temporary fixing of the thermally conductive sheet to an electronic component or a heat sink) to the heat conducting material used in the present invention are ideal. A polymer or the like with a single viscosity may be used, although mixtures of two or more polymers with different viscosities enable the production of a sheet with an excellent balance between flexibility and tackiness, and consequently the use of mixtures of two or more different viscosities is also possible.

[Heat Conducting Filler]

There are no particular restrictions on the heat conducting filler used in an aforementioned heat conducting composition, and any of the known materials typically used as heat conducting fillers in these types of applications may be used. Specific examples include metals such as non-magnetic copper and aluminum, metal oxides such as alumina, silica, magnesia, red iron oxide, beryllia, titania and zirconia, metal nitrides such as aluminum nitride, silicon nitride, and boron nitride, as well as other materials such as artificial diamond and silicon carbide.

From the viewpoint of achieving good levels of fluidity and thermal conductivity at the electronic component operating temperature, the average particle diameter of the heat conducting filler should preferably fall within a range from 0.1 to 100 μm, and preferably from 0.1 to 25 μm. If the average particle diameter is too small, then the viscosity of the composition becomes very high during mixing and filling, causing a significant deterioration in workability. Furthermore, when actually used as a heat dissipating member, because the viscosity is high during thermocompression, the gap between the electronic component and the heat dissipating component increases, and as a result the thermal resistance also increases, making it difficult to achieve a satisfactory heat dissipating performance. In contrast, if the average particle diameter is too large, then although the viscosity is low which improves the workability, when actually used as a heat dissipating member, the gap between the electronic component and the heat dissipating component cannot be reduced to a distance smaller than the diameter of the particles (for example, less than 100 μm), and consequently the thermal resistance increases, making it difficult to achieve a satisfactory heat dissipating performance. The filler may comprise a single material with a certain average particle diameter, or may also comprise a mixture of two or more fillers with different average particle diameters.

There are no particular restrictions on the shape of the particles of the heat conducting filler described above, although a spherical shape is preferred. If the particle shape is spherical, and a mixture of fillers with different average particle diameters is used, then a situation approaching the closest possible packing can be expected, producing an even better thermal conductivity, and consequently this type of mixture is recommended. For example, if an alumina powder (A) with an average particle diameter of 10 μm, and an alumina powder (B) with an average particle diameter of 1 μm are used, then the relative proportions of the two powders (A)/(B), in terms of weight, should preferably fall within a range from 70/30 to 90/10.

[Other Additives]

Where necessary, other additives or fillers used in synthetic rubbers may also be used in a heat conducting composition of the present invention.

Specific examples of such other additives include mold releasing agents such as silicone oil or fluorine modified silicone surfactants; coloring agents such as carbon black, titanium dioxide and red iron oxide; fire resistance imparting agents including platinum compounds, metal oxides such as iron oxide, titanium oxide and cerium oxide, and metal hydroxides; agents for improving the composition workability such as process oil, reactive silanes or siloxanes, reactive titanate catalysts and reactive aluminum catalysts.

In addition, precipitation prevention agents for preventing precipitation of the heat conducting filler at high temperatures such as fine powders of precipitated or calcined silica, and materials for improving thixotropy may also be added.

[Composition Preparation]

A composition of the present invention can be produced by uniformly mixing the various constituents of a composition using a rubber kneading device such as a twin-roll mill, a Banbury mixer, a dough mixer (kneader), a gate mixer or a planetary mixer, with heat also being applied where necessary.

Furthermore, a heat conducting composition used in the present invention can be easily obtained as a commercially available product, such as the product PCS-TC-10 (manufactured by Shin-Etsu Chemical Co., Ltd., thermal conductivity 5 W/m·K, softening point 48° C.) and the product PCS-TC-11 (manufactured by the same company, thermal conductivity 4.5 W/m·K, softening point 48° C.).

[Heat Conducting Material Layer]

In the present invention, the heat conducting material layer provided on at least one surface of an aforementioned graphite sheet is formed from a heat conducting material of the type described above. The thickness of this heat conducting material layer should preferably be within a range from 0.005 mm to 1.0, and even more preferably from 0.025 to 0.25.

EXAMPLES

As follows is a more specific description of the present invention, based on a series of examples. Unless otherwise stated, parts refers to parts by weight.

Examples 1 and 2

A silicone resin based composition manufactured by Shin-Etsu Chemical Co., Ltd. (brand name: PCS-TC-10, thermal conductivity: 5 W/m·K, softening point: 48° C.) was used as the heat conducting composition. 100 parts of this composition were dissolved by adding 15 parts of toluene, and this solution was used to form a coating on one side of a graphite sheet of thickness 100 μm manufactured by Matsushita Electrical Industrial Co., Ltd. (example 1), and to also form a coating on both sides of a separate graphite sheet (example 2), and these samples were then heated at 80° C. for 10 minutes to volatilize the solvent. In this manner, heat dissipating structures were prepared with a heat conducting composition layer of thickness 130 μm formed on either one side or both sides of an aforementioned graphite sheet.

Comparative Example 1

One surface of a graphite sheet similar to that used in the example 1 was treated with a primer (brand name: X-65-484, manufactured by Shin-Etsu Chemical Co., Ltd.), and a thermally conductive silicone rubber layer (brand name: TC-TH, manufactured by Shin-Etsu Chemical Co., Ltd.) of thickness 130 μm was then applied to the primed surface by screen printing. The layer was heated at 120° C. for 5 minutes to cure the rubber, yielding a heat dissipating structure.

Comparative Example 2

A sample was prepared using only a graphite sheet with no coatings.

Measurement of Thermal Resistance

The thermal resistance at 65° C. of the heat dissipating structures and the graphite sheet prepared in the examples and the comparative examples were measured using the method described below. The results are shown in Table 1.

[Measurement Method]

A sample of each heat dissipating structure of thickness 0.5 mm was punched out in the shape of a TO-3 transistor, and then positioned between a model heater (with a cross-sectional area of 7 cm$^2$) formed in the shape of a TO-3 transistor and a heat sink FBA-150-PS (brand name, manufactured by OS Co., Ltd.), and a compressive load of 69.0 to 690 kPa (10 to 100 psi) was applied. The heat sink was maintained at 65° C. by circulating water from a constant temperature water bath.

Next, 26 V, 1 A of electric power was supplied to the model heater, and after 5 minutes of heating, the temperature of the transistor (temperature $T_1$) and the temperature of a thermocouple imbedded in the heat sink (temperature $T_2$) were measured, and the thermal resistance $R_S$ (° C.·cm²/W) of the sample was then calculated from the following formula.

$$R_S = (T_1 - T_2)/26 \times 7 (°\text{C·cm}^2/\text{W})$$

TABLE 1

| Characteristics | | Example 1 Heat conducting composition coating on one surface | Example 2 Heat conducting composition coating on both surfaces | Comparative Example 1 Thermally conductive silicone rubber coating on one surface | Comparative Example 2 No coatings |
|---|---|---|---|---|---|
| Thermal resistance at 65° C. (° C · cm²/W) | Pressure 69.0 kPa (10 psi) | 0.98 | 0.77 | 2.45 | 2.73 |
| | Pressure 138 kPa (20 psi) | 0.77 | 0.63 | 2.03 | 2.31 |
| | Pressure 345 kPa (50 psi) | 0.49 | 0.49 | 1.26 | 1.68 |
| | Pressure 690 kPa (100 psi) | 0.35 | 0.35 | 0.70 | 1.05 |

As is clearly evident from the results shown in Table 1, the heat dissipating structures of the example 1 and the example 2 offer excellent heat radiation, and display a markedly lower thermal resistance than a graphite blank sheet (the comparative example 2) or a graphite sheet with a layer of a thermally conductive silicone rubber (brand name: TC-TH, manufactured by Shin-Etsu Chemical Co., Ltd.) of thickness 130 μm applied to one surface (the comparative example 2).

As described above, a heat dissipating structure of the present invention is provided between a heat generating electronic component and a heat dissipating component, and during operation of the electronic component, closely contacts both components, enabling a marked reduction in the thermal contact resistance between the two components, and providing excellent heat radiation. Notwithstanding this effect, at normal temperatures when the electronic component is not operating, the heat dissipating structure is a solid sheet, which results in considerable ease of installation and removal, and excellent workability.

What is claimed is:

1. A heat dissipating structure for positioning between an electronic component and a heat dissipating component, the heat dissipating structure comprising
    a graphite sheet; and
    a layer comprising a heat conducting material provided on at least one surface of said graphite sheet, wherein
        said heating conducting material has no fluidity at room temperature when said electronic component is not operating, but undergoes a reduction in viscosity, softens or melts, under influence of heat generated during operation of said electronic component;
        said heat conducting material comprises
            a silicone resin, which forms a matrix phase, and
            a heat conducting filler; and
        said silicone resin comprises T units represented by the formula $RSiO_{3/2}$ and D units represented by the formula $R_2SiO$, where R stands for a monovalent hydrocarbon group of 1 to 10 carbon atoms, at a ratio of T units to D units ranging from 10:90 to 90:10.

2. The heat dissipating structure according to claim 1, wherein said heat conducting material undergoes a reduction in viscosity, softens or melts, within a temperature range from 40 to 100° C.

3. The heat dissipating structure according to claim 1, wherein a thickness of said graphite sheet is within a range from 0.01 to 1.5 mm.

4. The heat dissipating structure according to claim 3, wherein a thickness of said graphite sheet is within a range from 0.1 to 1.0 mm.

5. The heat dissipating structure according to claim 1, wherein an average particle diameter of said heat conducting filler is within a range from 0.1 to 100 μm.

6. The heat dissipating structure according to claim 5, wherein an average particle diameter of said heat conducting filler is within a range from 0.1 to 25 μm.

7. The heat dissipating structure according to claim 1, wherein particles of said heat conducting filler are a spherical shape.

8. The heat dissipating structure according to claim 1, wherein a thickness of said layer comprising a heat conducting material is within a range from 0.005 mm to 1.0 mm.

9. The heat dissipating structure according to claim 1, wherein said silicone resin is a copolymer comprising the T units and the D units.

10. The heat dissipating structure according to claim 1, wherein said silicone resin comprises
    a polymer incorporating the T units, and
    a silicone oil or a silicone gum formed of the D units.

11. The heat dissipating structure according to claim 1, wherein said ratio of T units to D units ranges from 10:80 to 80:20.

12. A heat dissipating structure for positioning between an electronic component and a heat dissipating component, the heat dissipating structure comprising
    a graphite sheet; and
    a layer consisting of a heat conducting material provided on at least one surface of said graphite sheet, wherein
        said heating conducting material has no fluidity at room temperature when said electronic component is not operating, but undergoes a reduction in viscosity, softens or melts, under influence of heat generated during operation of said electronic component; and said heat conducting material consists essentially of a silicone resin, which forms a matrix phase, and a heat conducting filler.

13. The heat dissipating structure according to claim 12, wherein said heat conducting material consists of said silicone resin and said heat conducting filler.

14. A method of making a heat dissipating structure, the method comprising laminating a graphite sheet and a layer comprising a heat conducting material; and producing the heat dissipating structure of claim 1.

15. A method of making a heat dissipating structure, the method comprising laminating a graphite sheet and a layer consisting of a heat conducting material; and producing the heat dissipating structure of claim 12.

\* \* \* \* \*